United States Patent
Kennedy

[15] 3,703,960
[45] Nov. 28, 1972

[54] MARINE SEWAGE COLLECTION AND DISCHARGE SYSTEMS

[72] Inventor: Kenneth F. Kennedy, 3200 Portage Bay Place East, Seattle, Wash. 98102

[22] Filed: Sept. 15, 1970

[21] Appl. No.: 72,429

[52] U.S. Cl. .................210/121, 141/284, 210/170
[51] Int. Cl. ...........................................E03f 5/00
[58] Field of Search......210/121, 236, 220, 513, 170, 210/257; 141/284

[56] References Cited

UNITED STATES PATENTS

| | | | |
|---|---|---|---|
| 3,528,462 | 9/1970 | Quase | 141/284 |
| 3,543,294 | 11/1970 | Buester | 210/170 X |

Primary Examiner—Frank A. Spear, Jr.
Attorney—Roy E. Mattern, Jr.

[57] ABSTRACT

Liquid and solid waste from houseboat dwellings, ships and boats moored to and nearby stationary or floating docks at both fresh and salt water locations is collected and transferred to a sewer system ashore for treatment. This waterfront sewage collection and discharge system is essentially supported and held in place by docks and floats so it is not effected by water level changes caused by tides and waves.

From the outlets of house boats, ships and boats, sewage is directed through flexible couplings and collection pipes, arranged on grade, into partially submerged holding tanks. Each tank is equipped with pumping apparatus to periodically discharge sewage into pipes leading to a sewage system ashore.

Holding tanks are preferably comprised of several like units singly lowered away into the water and sealed together during their convenient installation. Often sewer pipe sections are used as these holding tank units. When docks and floats are changeable in elevation and sufficiently strong, holding tanks are suspended from them. When docks and floats remain essentially at the same elevation, holding tanks may be positioned on the bottom below or nearby them. Plastic pipes are often used and must be held underwater by restraining means to overcome their bouyancy. Expansion and contraction of component assemblies caused by water motion and temperature changes are always compensated for by flexibly joining some members together.

16 Claims, 7 Drawing Figures

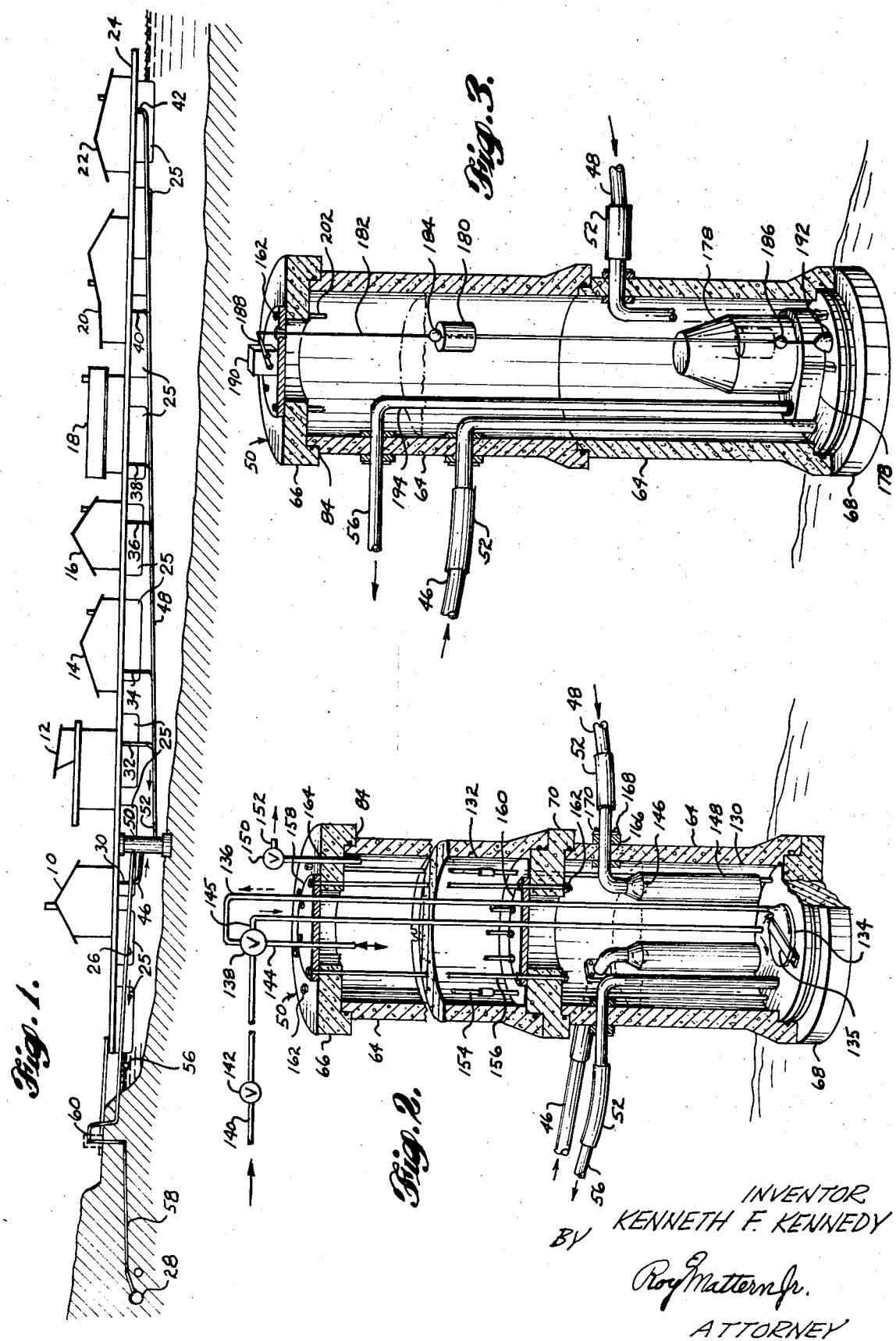

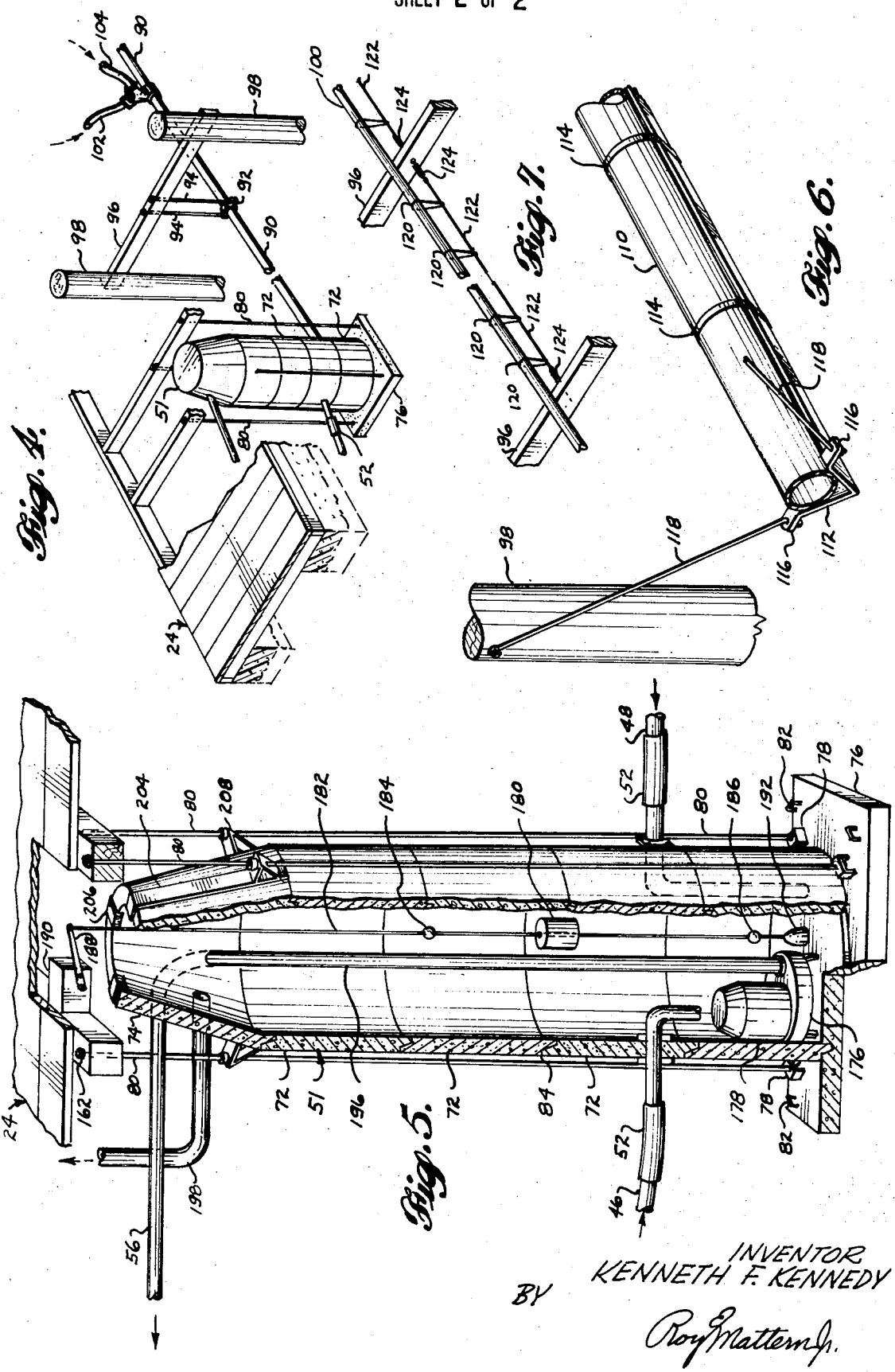

MARINE SEWAGE COLLECTION AND DISCHARGE SYSTEMS

BACKGROUND OF THE INVENTION

As the number of persons interested in living permanently and occasionally, at waterfront locations in floating dwellings, ships and boats increases, sanitation becomes a problem. Also holding tanks are being proposed for use on cruising boats and these are to be emptied at marinas. However, well designed sewage systems have not been available to collect and to transfer this waterfront sewage to land based sewage collection and treatment systems. Therefore, this sewage collection and transfer system for house boats, boats and ships anchored and moored around docks and floats is now available. It provides a system designed to cope with all underwater collection problems such as those associated with installation, servicing, repairs, inspection, corrosion, sealing, clearance from potential damage by watercraft movements, and mobility caused by water movements of tide, currents and waves.

SUMMARY OF INVENTION

Sewage at waterfront facilities where houseboats, boats and ships are moored and/or stop for service is collected in a system supported by the facilities such as docks and floats and then pumped into a shore system. The water system is positioned to be accessible for convenient connections to the houseboats, boats and ships, yet out of the way of their movements and at all times being responsive to water motions caused by watercraft, wind, other waves, and tides. The waterfront sewerage system uses components already available to the fullest extent possible. The partially submerged collection tanks are often comprised of multiple sections of sewer pipes sealed together and then capped at the remaining open ends.

DRAWINGS OF THE PREFERRED EMBODIMENTS

FIG. 1 is an elevation, partially in section, of several houseboats moored along a dock near the shore of a body of fresh water, indicating how a waterfront sewage collection and discharge system is arranged;

FIG. 2 is a perspective view, partially in section, of a partially submerged collecting and holding tank with a compressed air system which periodically discharges sewage from the tank, which rests on the bottom, into a shore sewage system;

FIG. 3 is a perspective view, partially in section, of another partially submerged collecting and holding tank with a submersible pump which periodically operates to discharge sewage from the tank, which rests on the bottom, into a shore sewage system;

FIG. 4, is a perspective view of selected portions of a dock indicating how another partially submerged collecting and holding tank is suspended from selected dock structural members;

FIG. 5, is an enlarged perspective view, partially in section, of the collecting and holding tank shown in FIG. 4 showing equipment in its interior;

FIG. 6 is a partial perspective view of plastic drain pipe indicating how it is arranged underwater and secured to holding structure which in turn is fastened to the dock; and FIG. 7 is a partial perspective view of a plastic drain pipe indicating how it is arranged under a dock and secured at intervals to a cable which in turn is fastened to the dock.

DESCRIPTION OF PREFERRED EMBODIMENTS

General Arrangement and Utilization

Persons are living in house boats 10, 12, 14, 16, 18, 20, and 22, as indicated in FIG. 1. They will only continue to live in house boats moored to a dock 24, float 25 or nearby to them, from the public health and pollution standpoint, if the sewage is collected and held, as necessary, in a waterfront sewer system 26 and then pumped ashore into a major land sewer system 28 that includes a sewage disposal plant, not shown. The same is true regarding persons living aboard boats, yachts and ships moored to a dock, float or nearby to them. Moreover, boats, yachts and ships underway in coastal and inland waters may be required to collect and hold sewage until a port is reached. There the sewage will be pumped into a waterfront sewage collection discharge and transfer system 26 that has multiple fittings, not shown, to conveniently receive sewage discharge from boats, yachts, ships and house boats.

Whatever dwelling is supported buoyantly or whatever watercraft is tied up, the general arrangement of FIG. 1 indicates the overall essentials of a waterfront sewage receiving system 26 and its connection to a shore sewage collection system 28. Sewage is first directed through flexible couplings secured to respective water craft and to respective sewer lead ins of various lengths 30, 32, 34, 36, 38, 40, and 42. From these lead ins, sewage enters a main sewer line 46, or 48 or others arranged about a partially submerged collecting and holding tank 50. Main sewer lines 46, 48 are arranged on a grade line and preferably include another flexible coupling 52 located near tank 50 to compensate further for movements caused by water motions and temperature changes. Upon collection of a pre set volume or weight of sewage, pumping means of a selected type installed in a tank 50 is automatically operated to pump sewage from tank 50, through discharge line 56 into a side sewer 58 and beyond into a main shore sewage collection system 28. An interchange 60, between discharge line 56 and side sewer 58 may be above ground for control, observation and servicing.

In fresh water installations where the range of water level change is very moderate and the water is not too deep, a larger and heavier holding tank 50 may be installed on the bay, lake, or river bottom, as shown in FIGS. 1, 2, and 3. However, where the water is too deep and/or the tidal changes are large, a holding tank 50 is supported by the dock 24 and/or floats and as a consequence it is generally made smaller. Therefore to compensate for the lower capacity, when a smaller tank is used, quite often the main sewer lines 46, 48 of the waterfront system 26 hold sewage in addition to the tank 50 between operating periods of the discharge pumping means. However, throughout all these waterfront sewage collection systems, check valves are used to avoid unwanted reverse flows of sewage.

Partially Submerged Holding Tanks of Multiple Sections

Because of the inconvenience of handling heavy large tanks and/or because of the variable design capacities specified for respective new tank installations and their possible modification, a preferred design of any holding tank involves joining together of multiple cylindrical sections as illustrated in FIGS. 2, 3, 4, and 5. Now whenever possible, standard large concrete sewer sections are used in making a tank 50. Although as the demand for waterfront sewage collection facilities increases, new designs of components over and above those presently illustrated, and also better construction equipment, are anticipated. Subsequently, therefore, the present time and cost savings realized by using currently available sewer sections may no longer be as an important consideration.

As noted in FIG. 2, each tank section 64 is closed at either end with a transverse section, being either a top 66, bottom 68 or mid 70 section. In FIG. 3, each tank section 64 remains open to the other but closed at the overall bottom with transverse section 68 and at the top with transverse section 66. In FIG. 5, use of other types of sections is illustrated. Central sections 72 are alike and interchangeable. Top section 74 is conical and bottom section 76 extends beyond the central sections 72 to provide brackets 78 for securing supporting rod members 80 and also pad eyes 82 to receive rigging components that are used during the installation of this tank 51 which is suspended from a dock 24. Often bottom section 76 is made heavier to provide ballast or it is arranged to receive ballast. Preferably, initially flowable, waterproof, sealing materials 84 are used in all joints of tanks 50, 51 to complete the water tight integrity of these tanks.

Arrangement and Support of Pipes

As indicated in FIG. 4, when metal pipes 90 are used, their own strength and weight is relied upon. They are only supported at space distances by multiple piece rings 92 which surround them and after fastening are in turn secured to and supported by hanging rods 94. The latter are secured to selected dock members such as cross brace 96 extending between dock pilings 98. The lengths of various hanging rods 94 or other supporting units are selected so any overall run of pipes 90 remains on grade guiding sewage downwardly into holding tanks 50 or 51. At different locations pipes 90 are equipped with tees, elbows, or receivers 100, etc. to which are attached branch lines 102, 104 coming in from respective water craft connection systems.

There are advantages in using plastic pipes 110 such as their lighter weight and resistance to deterioration by salt water. However, more brackets must be used to provide better support and also to overcome any tendency of their buoyancy to dislodge them. In FIG. 6, plastic pipe 110 is laid in a heavy receiver 112 and secured to it by multiple loops 114 of strong but non abrasive ties. At selected fewer places, heavy receiver 112 is equipped with tabs 116 which receive positioning rods 118 that in turn are secured to pilings 98 or to other selected structure of a dock 24. In FIG. 7, plastic pipe 110 is held in position as multiple larger loops 120 are secured about both pipe 110 and cable 122 and then cable 122 is secured between dock members such as cross braces 96. Turnbuckles 124 are turned to tighten cables 122, completing the positioning of plastic pipe 110 in this flexible overall installation.

At all times whether buoyant or non buoyant pipe materials are used, the resulting sewage collection pipes in this waterfront system must be installed on a good grade, be well positioned out of danger areas where they could be struck by water craft, and be reasonably accessible for inspection, testing, and repair.

Discharge Apparatus to Transfer Sewage Ashore

As shown in FIG. 2, a compressed air system is used in conjunction with tank 50 to be operated to transfer sewage from the waterfront sewage system 26 to the shore sewage collection system 28. As shown in FIGS. 3, and 5, a motor driven pump is used for this same purpose. Whatever transfer equipment is used it will be operated, only periodically in most overall installations, to remove collected sewage from tanks 50, 51. Therefore there are controls installed, to detect when the sewage transfer should be undertaken and stopped.

Regarding Compressed Air Apparatus

In FIG. 2, tank 50 has a lower collection air tight compartment 130 and an air tight compartment above 132 to receive accumulated air under pressure and respective air lines directed to the lower compartment 130. The flow through these respective lines is controlled by valves that are initially opened or closed in response to the signals received as an air bladder 134 secured by bracket 135 in the bottom of tank 50 senses the amount of sewage being collected above it. As the height of the sewage collected increases and the internal pressure of air bladder 134 increases sufficiently, then the increased pressure sensed through air line 136 operates a three way valve 138.

In one position, three way valve 138 stops all flow of air. In another position it directs flow of air from an air compressor, not shown, through: intake line 140, cup off valve 142, itself valve 138, and then through line 144 into higher compartment 132 of tank 50, filling this compartment with an accumulated source of compressed air. In a third position it directs air from compartment 132, through line 144 and from line 140, into line 145 extending down to the lower compartment 132 of tank 50 to compressibly expel the sewage, taken in from collection lines 46, 48, out through discharge line 56.

Check or stop valves 146 in the anti-splash tube exits 148 of collection lines 46, 48 prevent the reverse flow of sewage in these collection lines. At all times relief valve 150 in line 152 is ready to open directing air under excessive pressure into the atmosphere to avoid any possibility of an unwanted partial or complete cracking or bursting destruction of tank 50. Within the operating pressures and reasonably above them, connecting rods 154 are used to hold together the sections of tank 50. Also tension rods 156 are used to hold access covers 158, 160 in place. Various nuts 162 are threaded in place and tightened on these rods 154, 156 to complete the rod assemblies.

Seals 164 are installed or created wherever air pipes and rods pass through tank structure. Also where sewage pipes enter or leave tanks 50, 51 sealed packing conversion structures 166 are utilized to compensate for the curved structure of tanks 50, 51 and then to receive tightening forces applied to the fasteners 168 drawing the respective flanges 170 together.

Regarding Motor Driven Pumping Apparatus

In FIGS. 3 and 4, collection and holding tanks 50, 51 are equipped with submersible pumps 176 positioned on the bottom of each tank and driven by electrical motors, not shown, sealed within their housings 178. The operation of these pumps 176, is controlled, in the illustrated way, by having a float 180, guided on a nylon float line 182, raised and lowered upon the changing level of the variable quantity of collected sewage, contacting, alternately, top and bottom stops 184, 186. Upon contacting the top stop 184 and raising it, the spring biased or counter balanced arm 188 of pump control switch 190 raises upwardly to throw the switch on directing electrical power to submersible pump 176. As the level drops, float 180 moves downwardly until contacting and moving lower stop 186. It inturn pulls on float line 182 rotating or pivoting arm 188 of pump control switch 190 downwardly, thereby opening the switch and shutting down submersible pump 176. The vertical positioning of float line 182 is maintained by securing it to a weight 192 at its bottom near the bottom of tank 50 or 51.

In these tanks 50 or 51 in FIGS. 3 and 5, the discharge of the submersible pump 176 is directed up through respective lines 194, 196 into the outer discharge line 56 of the overall waterfront system to which it is connected.

Venting

In regard to tank 51, illustrated in FIG. 5, a vent line 198 is used as shown. In other installations, venting is undertaken by opening the system, during non pumping periods, in an area removed from the water craft.

Maintenance of Seals and Tank Assembly

Whenever any multiple sectioned tank is used, the below water joints must remain sealed. Although initially seals are installed, there must continue to be the precise positioning of the sections and their respective mating portions. In the compressed air system, connecting and tension rods 154, 156 were used to keep the sections together. In respect to tank 50, shown in FIG. 3, rods 202, shown in part, secured with nuts 162, hold the assembly together. In reference to tank 51, shown in FIGS. 4 and 5, supporting rods 80 are also used to hold the assembly together. In the particular conical top tank embodiment illustrated in FIG. 5, gripping clamps or bars 204 with their hook ends 206 at the top and their rod receiving brackets 208 at the bottom are utilized in maintaining the axial compression forces that are necessary to keep all the tank sections together as a sealed unit below the water.

Summary of Advantages

A waterfront sewage collection, holding and discharging system is provided in various embodiments to be easily installed, operated and maintained to meet the highest exacting requirements of any waterfront facility for house boats, boats, and ships staying at the facility for any period of time. The system is readily operated in conjunction with a major shore sewage collection and disposal system and, if necessary, is adaptable to be connected to a local sewage disposal system or to its own sewage treatment system.

I claim:

1. A sewage collection and discharge system for house boats, ships, and boats, moored to docks and floats, other tie up facilities, and marinas, comprising:
    a. a partially submerged collection and holding tank;
    b. collection lines extending from various water craft to the holding tank;
    c. discharge line from the holding tank to a shore sewage collection facility; and
    d. a pumping means, in the partially submerged collection and holding tank to remove sewage from the collection and holding tank and direct it through the discharge line into a shore sewage collection facility.

2. In the sewage collection and discharge system, as claimed in claim 1, a collection and holding tank formed of multiple sections.

3. In the sewage collection and discharge system, as claimed in claim 2, tension rods being used to compressively hold together the sections of the collection and holding tank.

4. In the sewage collection and discharge system, as claimed in claim 3, sealing materials being used between the sections and maintained in such position by the functioning tension rods, thereby maintaining seal sections under the water.

5. In the sewage collection and discharge system, as claimed in claim 1, the collection lines being installed and maintained on grade to guide the flow of sewage into the collection and holding tank.

6. In the sewage collection and discharge system, as claimed in claim 1, the pumping means being a submersible pump having an enclosed electrical motor.

7. In the sewage collection and discharge system, as claimed in claim 6, a movable float assembly being used to actuate a switching means of the submersible pump.

8. In the sewage collection and discharge system, as claimed in claim 1, the pumping means being a compressed air system to expel the sewage from the collection and holding tank.

9. In the sewage collection and discharge system, as claimed in claim 8, an air bladder being used to actuate a valve means to control the entry of compressed air.

10. In the sewage collection and discharge system, as claimed in claim 1, a sewage level sensing means used to periodically operate the pumping means.

11. In the sewage collection and discharge system, as claimed in claim 10, the sewage level sensing means being adjusted to allow sewage to be held also in the collection lines to enhance the overall holding capacity of the system.

12. In the sewage collection and discharge system, as claimed in claim 1, flexible connectors being used throughout the system to accommodate for water motions and temperature change motions.

13. In the sewage collection and discharge system, as claimed in claim 1, adjustable supports being used throughout to connect components of the system to dock and float structures.

14. In the sewage collection and discharge system, as claimed in claim 1, check valves being used in collection lines to prevent reverse flows.

15. In the sewage collection and discharge system, as claimed in claim 1, ballast and hold down means being used to overcome buoyancy.

16. In the sewage collection and discharge system, as claimed in claim 1, rigging facilities being installed to facilitate initial assembly and subsequent repairs.

* * * * *